Oct. 31, 1961    J. FERLA    3,006,402
APPARATUS FOR FORMING GLASS REINFORCED PLASTIC PIPE
Filed Aug. 31, 1955    3 Sheets-Sheet 1
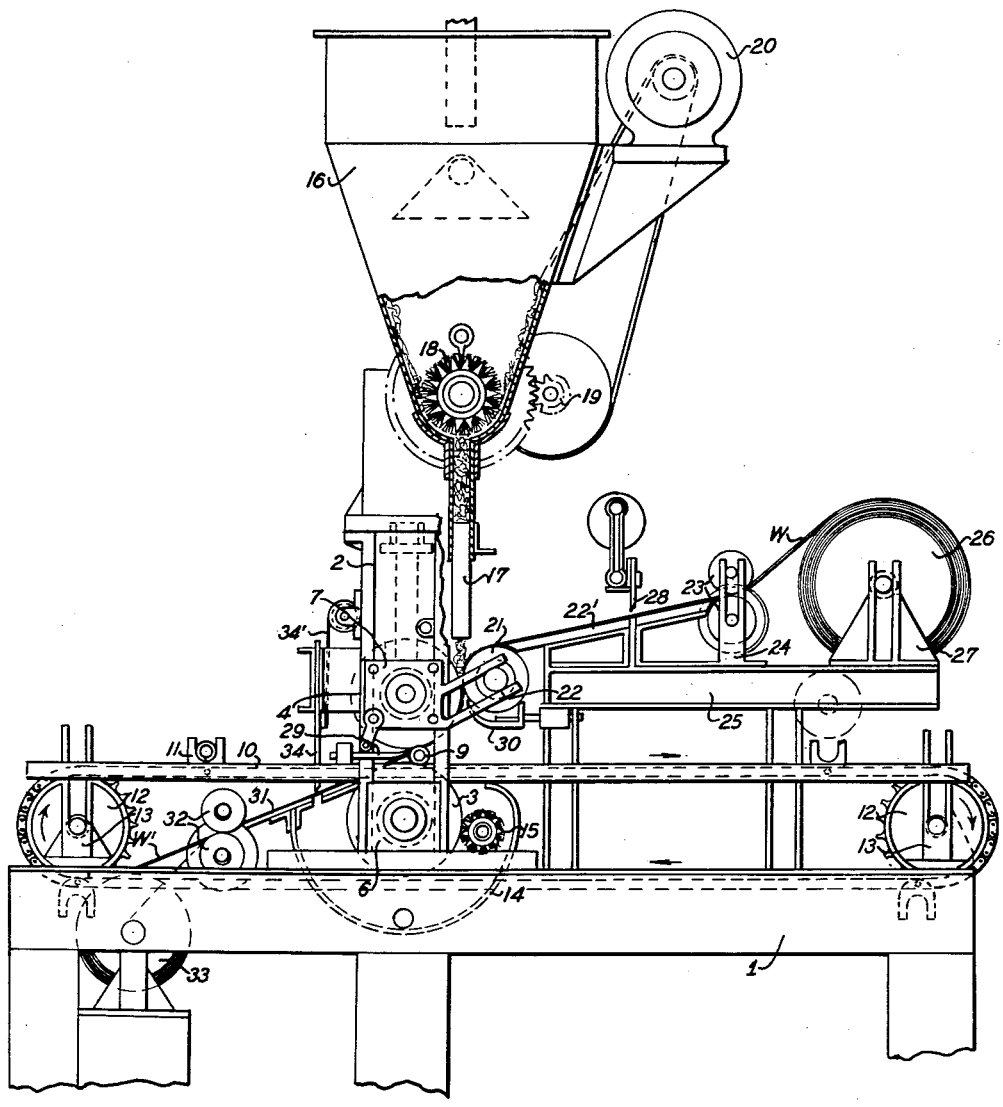
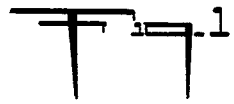
INVENTOR
JOHN FERLA
BY
ATTORNEYS

INVENTOR
JOHN FERLA

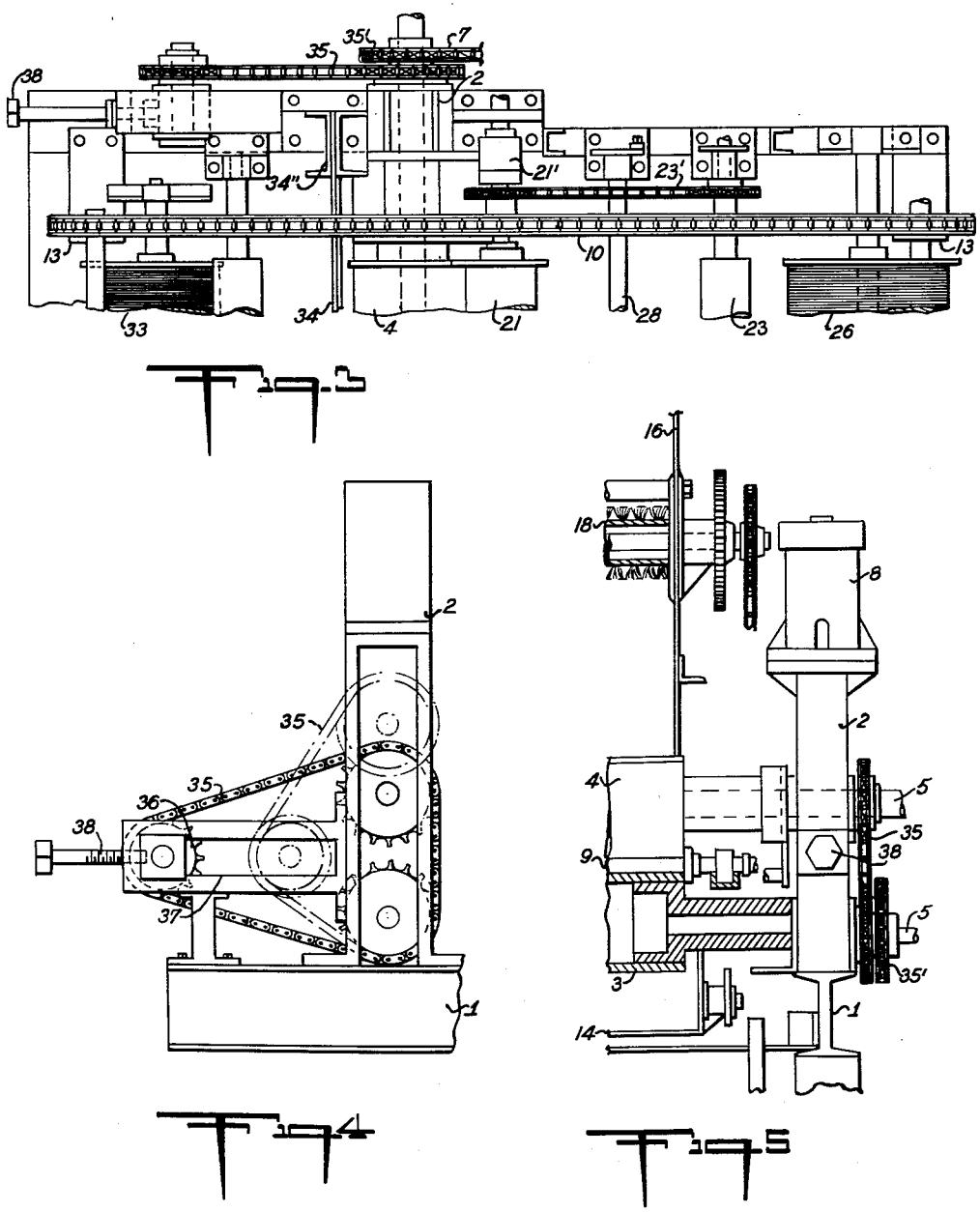

United States Patent Office 3,006,402
Patented Oct. 31, 1961

3,006,402
APPARATUS FOR FORMING GLASS
REINFORCED PLASTIC PIPE
John Ferla, 5 Whitney Place, East Orange, N.J.; Irma
Ferla, executrix of said John Ferla, deceased, assignor
to herself
Filed Aug. 31, 1955, Ser. No. 531,686
2 Claims. (Cl. 156—192)

This invention relates to improvements in machines for producing plastic pipe.

Various attempts have been made heretofore to use plastic material in forming pipe, and while some plastic pipes are available, these have not been suitable for use under high temperatures and high pressures. Moreover, they have been extremely expensive to manufacture and are subject to many objections in service.

One object of this invention is to provide for the manufacture of plastic pipe that will withstand high temperatures and high pressures, that may be made of various sizes as desired, and which may be manufactured relatively inexpensively.

Another object of this invention is to manufacture plastic pipe with or without asbestos, with or without glass wool or glass fiber, and with or without a filler such as diatomaceous earth.

A further object of the invention is to improve machines for manufacturing plastic pipe to construct the pipe of sufficiently durable character that it will withstand a working pressure up to approximately 150 lbs. per square inch or more and to be used under high temperature. Temperatures of 400° to 550° F. can be obtained.

Still another object of the invention is to simplify and improve pipe producing machines to enable such machines to be used in forming pipe of plastic material reinforced with glass fibers or glass wool. Provision should be made for compacting the composition material under sufficient pressure to form a durable wall structure for the pipe and for combining glass fibers or glass wool with the plastic material to improve the quality of the pipe produced thereby. It is also possible to meet certain specifications with the addition of asbestos fibers.

These objects may be accomplished by providing a mandrel in a pipe producing machine to which successive layers of material are applied in building up the desired wall thickness for the pipe. Calendering rolls should be provided in pressure relation to the mandrel, with suitable provisions for moving the same to accommodate variations in thickness of the wall structure of the pipe, as well as the introduction of the mandrels and the removal of the formed pipes from the machine. Provision should be made also for the application of heat in sufficient quantity to soften the plastic material contained in the composition. This may be done by using steam heated rolls or other suitable forms of heating means desired. I have provided also for supplying one or more layers of glass wool to incorporate this into the wall structure of the pipe for reinforcing and stengthening this effect.

Certain embodiments of the invention are illustrated in the accompanying drawings, in which:

FIG. 1 is a diagrammatic side view of a machine embodying this invention;

FIG. 3 is a partial top plan view of the form shown in FIG. 1;

FIG. 4 is a detail side elevation of the drive for the calendering rolls; and

FIG. 5 is a detail side elevation, partly in section, showing the support for the calendering rolls.

Figure 2:
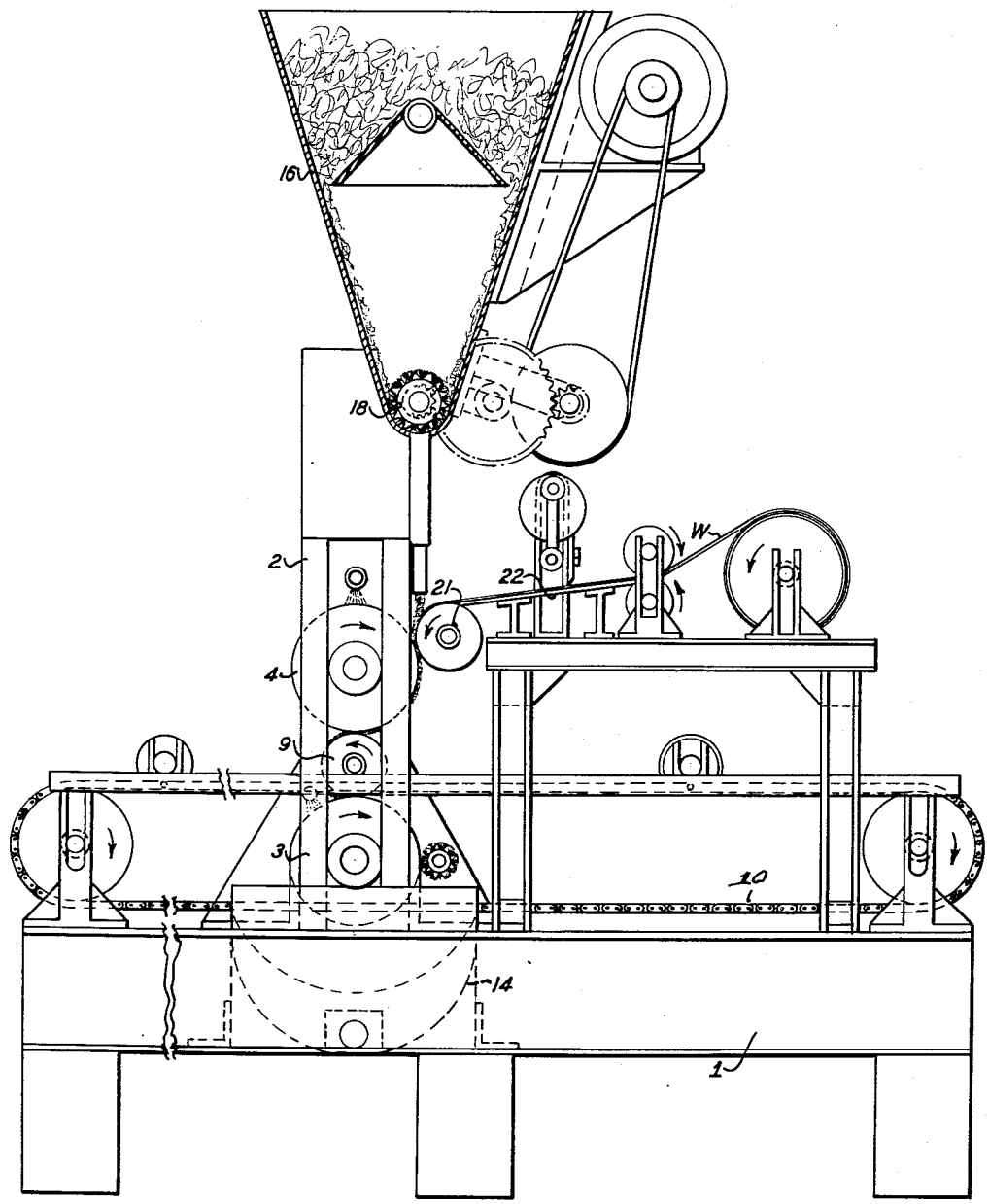
FIG. 2 is a similar view showing a modification thereof.

Referring first to FIG. 1, the machine is shown as provided with a frame structure including sills, generally indicated by the numeral 1, supported upon a suitable foundation. Upstanding guides are shown at 2, spaced apart transversely of the frame 1, within which are journaled the opposite end portions of calendering rolls 3 and 4. Each of the calendering rolls may be constructed hollow, as illustrated in FIG. 5, and having an axial passage therethrough for steam, which may be connected therewith through a steam pipe 5 for the circulation of steam through the respective calendering rolls, or otherwise constructed to be heated. This will provide a heated surface thereon as desirable for forming pipe of plastic material.

The reduced ends of the calendering rolls 3 and 4 extend through the guides 2 adjacent said ends and are mounted in suitable journal bearings, as indicated at 6 and 7 in FIG. 1. The upper bearings 7 for the calendering roll 4 are preferably slidably mounted in the guides 2 and are supported by hydraulic cylinders 8 connected therewith through pistons that will cause the bearings 7 to raise and lower the calendering roll 4 to position said roll in surface contact with the formed pipe on the mandrel.

The mandrel is indicated at 9 and normally is located between the calendering rolls 3 and 4 during the application of the composition material thereto. The mandrel 9 is also hollow for the circulation of steam therethrough, or provided with suitable heating means. Detachable connections should be provided at opposite ends of the mandrel to permit removal of the mandrel.

I have provided for the movement of the mandrel 9 into and out of the machine, as for instance, by an endless conveyor, generally designated 10, having yokes 11 thereon for receiving and supporting the mandrels at spaced points. The conveyor 10 is operated step-by-step, successively moving a mandrel into its position between the calendering rolls 3 and 4 and then out of the position transversely of the machine as another mandrel is moved into position. The opposite ends of the endless conveyor 10 are guided by sprocket wheels 12 supported in suitable bearings, generally indicated at 13, mounted on the frame 1.

The calendering roll 3 is shown as enclosed within a semi-circular apron 14 to trap any material that may be removed from this calendering roll or which may drop from above. A fiber brush 15 operates against the periphery of the calendering roll 3 to keep the latter free of an accumulation of material thereon. The calendering roll 3 will be brushed clean by the operation of the brush 15 in contact with its surface.

The pipe forming material is supplied through a distributing hopper 16 supported in an elevated position above the frame structure and having a discharge spout 17 extending downwardly at a lateral edge of the calendering roll 4. A brush or other suitable distributor 18 is mounted in the bottom of the hopper 16 to prevent clogging of the material therein. This brush 18 is shown as being operated by gearing, generally indicated at 19, from an electric motor or suitable drive means, shown at 20, mounted on a side of the hopper 16.

At one side of the calendering roll 4 is mounted a steam heated pressure feed roll 21 arranged substantially in pressure relation with a side of the roll 4. The pressure feed roll 21 has the trunnions at opposite ends thereof, mounted in an inclined guideway 22 provided on a side of the bearing 7, so as to be raised and lowered with the calendering roll 4 and to be maintained in lateral bearing pressure engagement against a side of the roll 4.

The pressure feed roll 21 is driven by friction engagement with the calendering roll 4 and is mounted at the lower end of an inclined platform 22' which extends lengthwise of the machine to a pair of feed rolls 23.

The feed rolls 23 are mounted in bearing brackets 24 carried by an elevated frame structure 25 supported on the sills of the frame 1. Suitable means may be provided for driving the feed rolls 23, preferably in timed relation with the roll 21, as by a chain 23' (FIG. 3). The roll 21 may be driven through a clutch 21' (FIG. 3).

A reel for glass fibers is shown at 26, supported on the frame 25. The glass fibers are preferably in the form of a sheet or web W of fibers wound on the drum 26, detachably mounted in bearings 27 on the frame 25. The sheet or web of the glass fibers W extends through the pair of feed rolls 23, over the platform 22, and over the pressure feed roll 21, into the bite between the rolls 4 and 21, to which the composition material discharged from the hopper 16 is also directed. When the formation of the pipe is completed to the desired wall thickness, or when sufficient glass fibers have been added, the web W may be cut off by a power operated cutter, generally indicated at 28.

The composition material and web of glass wool are combined and formed as layers on the periphery of the calendering roll 4, being led along the surface thereof to the point of contact with the mandrel 9, onto which they are transferred as layers to the mandrel.

Scraper blades are shown at 29 and 30 in contact with the surfaces of the rolls 4 and 21 to release the materials from the rolls and to prevent these materials from following around the surfaces thereof beyond the points of separation.

Provision may be made, if desired, for supplying a second web of glass wool and asbestos, as shown in FIG. 1, or one web only may be used, if preferred, as illustrated in FIG. 2, the remaining structure and manner of operation being the same otherwise. Thus, according to FIG. 2, two layers will be applied at a time, while in FIG. 1 three layers will be applied at one time.

Where two webs of glass wool are desired, an inclined platform may be provided at the opposite end of the machine from the platform 22, as indicated at 31, and being directed upwardly to the periphery of the roll 3. A pair of feed rolls are shown at 32 for feeding the web W' from a reel 33 mounted below the frame of the machine. A reciprocating cut-off blade for the web W' is shown at 34, suspended by chains 34' between guides 34" (FIG. 3).

A suitable mixture or composition may be supplied in powdered form through the distribution hopper 16 to form the desired wall thickness for the pipe. It is preferred that plastic material be employed, such as the known synthetic resins, phenols, polystyrene and the like, as hereinafter described more in detail. The powdered resin or plastic material may be used combined with asbestos fibers and mixed with filler and glass fibers or glass wool, or both may be added and supplied in a dried powdered condition through the hopper 16, being discharged from the latter through the spout 17 into the bite between the rolls 4 and 21.

The rolls 4 and 21 are heated to a temperature sufficient to soften the plastic binder material as it is deposited in the bite between these rolls. The pressure of the latter forms a layer of this material on the periphery of the roll 4, and also feeds the web W therewith, combining the two as these adhere to the periphery of the roll 4, and are carried thereby around to the heated mandrel 9. The scraper 29 separates the adhering layer from the roll 4, preventing the material from building up on the roll.

If desired, according to the form of invention shown in FIG. 1, an additional web W' of glass fibers may be supplied also onto the mandrel 9, on the opposite side of the layer of plastic material from the web W. As soon as the desired thickness is built up on the mandrel, or when the desired quantity of glass fibers have been added, the webs W and W' are severed by the cutters 28 and 34, and the formed pipe is complete.

The driving of the calendering rolls 3 and 4 is illustrated in FIGS. 3 and 4, the several rolls being driven by a chain 35', and these being connected together through a drive chain 35 at one end, that extends over a sprocket 36 adjustably mounted in a guideway 37 so as to move back and forth between the full-line and the dotted-line positions in FIG. 4, according to the spacing of the roll 4 from the roll 3. These may be shifted by a screw 38, as the wall thickness of the formed pipe increases.

The rolls 3, 4 and 21 and the mandrel 9 are heated by steam or other suitable means to a sufficient extent to melt the plastic and thereby bond the materials into substantially a homogeneous mass as the layer is supplied to these rolls and builds up on the mandrel. This melting is not to an extent such as would cause the plastic to run, but only causing a softening thereof to effect a bonding of the materials together. This depends on the resin or plastic used.

As soon as the material on the mandrel has built up the desired thickness of coating thereon, the conveyor 10 is operated to move the mandrel out of the machine and to move another mandrel into place between the rolls 3 and 4. The hydraulic cylinder 8 is operated to withdraw the roll 4 from the mandrel during this movement, lifting it relative to the guides 2. However, during the forming of the pipe, the cylinder holds the calendering roll 4 in contact with the mandrel and the formed pipe thereon.

The manufacture of pipe, according to this invention, utilizes a filler or fillers and a suitable binder. The filler may be composed of glass fibers used alone or with asbestos fibers, which latter are supplied through the hopper 16 with the binder, or the asbestos fibers may be used alone without the glass fibers, and combined with the binder.

The binder can be of any suitable material which may be activated with heat, such as synthetic resins of the types that are thermoplastic or thermosetting. Such resins are heated by contact with the hot rolls to be combined with the fibers of asbestos or glass or both and thereby provide a layer on the surface of the roll.

The resins referred to may be of any suitable type, such as vinyl acetate, chloride, vinyl copolymer, polystyrene, polyethylene ester, phenolic, cresylic, xylenol, natural rosin or asphalt, etc. Plasticizers can be added to the resin during the manufacture of the latter or before using in the manufacture of the pipe, or added to the filler before making the pipe. Natural resins can be used, such as rosin, asphalt with asbestos or with asbestos and glass fibers.

By the addition of aldehydes and catalysts to any of these groups, such as phenol, cresol, or xylenol, heat may be applied, which causes a setting up of the resins. Diatomaceous earth may be used also therewith, acting as a catalyst for speeding the setting of the resin on the hot rolls, and also making it flame resistant and acid resistant. Not more than 15% of diatomaceous earth should be employed. This produces a more uniform curing or setting up over the entire pipe.

Vinyl resins need a stabilizer, such as zinc stearate or litharge, in an amount of approximately 2%. When from 8 to 10% of fossil flour is added to the vinyl resin, the latter is more resistant to chemicals and heat, and thereby improves the flame resistance of the binder. Asbestos and glass fibers or either may be mixed with the resin, forming pipe that is very resistant to chemical reactions. Phenol, cresols, and xylenols are condensation resins; vinyl, polyethylene, polystyrene, etc. are polymerized resins. Either condensate or polymerized resins can be used to form pipe, etc. on this apparatus.

By heating the mandrel and having the calender rolls warm a more uniform dense pipe or sheet is formed.

By the addition of kieselguhr, the plastic material sets up faster on the mandrel, forming less porous material.

To remove the mandrel from the plastic material, it is necessary to chill the mandrel to shrink the mandrel from the plastic material. This can be done by air, water or refrigeration.

Pipes or sheets made on this machine are built up on a revolving mandrel. Binders (resins) are introduced in a very finely divided state. Calender rolls compress the ingredients as they are applied to give a dense product. Combination of the web of long glass fibers and the random short fibers or both glass and asbestos give superlative reinforcement. Thus high strength and solid non-porous materials are formed. Said pipe is more chemical resistant, which is due to the manufacturing process.

While the invention has been illustrated and described in certain embodiments, it is recognized that other variations and changes may be made therein without departing from the invention, as set forth in the claims.

I claim:

1. In a machine for producing pipe, the combination with a mandrel adapted to receive layers of composition material thereon, of means for supplying plastic composition material in superposed layers on the mandrel, said means including a calendering roll located above said mandrel, a movably mounted pressure feed roll located laterally of said calendering roll and adapted to be moved into and out of frictional engagement with the calendering roll, said mandrel and rolls being heated, a hopper located above said rolls having a discharge outlet arranged to direct plastic composition material therefrom into the bite between the pressure feed roll and calendering roll forming a layer on the calendering roll for transfer thereby to the mandrel, power means connected with the calendering roll for raising and lowering the latter, means located laterally of said pressure feed roll on the side thereof opposite said calendering roll for supplying a web of glass fibrous material into the bite between the pressure feed roll and the calendering roll in superposed relation on said composition material on said calendering roll for transfer in layers spirally on said mandrel with the fibrous material superposed on said composition material.

2. In a machine for producing pipe, the combination with a mandrel adapted to receive layers of composition material thereon, of means for supplying plastic composition material in superposed layers on the mandrel, said means including a calendering roll located about said mandrel, a movably mounted pressure feed roll located laterally of said calendering roll and adapted to be moved into and out of frictional engagement with the calendering roll, said mandrel and rolls being heated, a hopper located above said rolls having a discharge outlet arranged to direct plastic composition material therefrom into the bite between the pressure feed roll and the calendering roll forming a layer on the calendering roll for transfer thereby to the mandrel, power means connected with the calendering roll for raising and lowering the latter, means located laterally of said pressure feed roll on the side thereof opposite said calendering roll for supplying a web of glass fibrous material into the bite between the pressure feed roll and calendering roll in superposed relation on said composition material on said calendering roll for transfer in layers spirally on said mandrel with the fibrous material superposed on said composition material, said web supplying means including an inclined platform located below said hopper laterally thereof and arranged tangent to the upper surface of the feed roll and extending upwardly therefrom, means located laterally of the upper end of the platform for supplying a web of fibrous material over the upper surface of the platform, and feeding rolls arranged at the upper end of the platform for feeding the web downwardly relatively thereto.

References Cited in the file of this patent

UNITED STATES PATENTS

| | | |
|---|---|---|
| 1,979,656 | Whitman | Nov. 6, 1934 |
| 2,163,289 | Pennel et al. | June 20, 1939 |
| 2,316,202 | Warner | Apr. 13, 1943 |
| 2,364,061 | Ferla | Dec. 5, 1944 |
| 2,368,475 | Kemmler | Jan. 30, 1945 |
| 2,398,876 | Bailey | Apr. 23, 1946 |
| 2,413,551 | Englund | Dec. 31, 1946 |
| 2,430,411 | Rembert | Nov. 4, 1947 |
| 2,484,965 | Slaughter | Oct. 18, 1949 |
| 2,486,761 | Pfeiffer | Nov. 1, 1949 |
| 2,614,058 | Francis | Oct. 14, 1952 |
| 2,629,894 | Boggs | Mar. 3, 1953 |
| 2,649,133 | Just | Aug. 18, 1953 |
| 2,690,412 | Nebesar | Sept. 28, 1954 |
| 2,714,414 | De Ganahl et al. | Aug. 2, 1955 |
| 2,771,388 | Rocky et al. | Nov. 20, 1956 |

FOREIGN PATENTS

| | | |
|---|---|---|
| 405,659 | Great Britain | Feb. 9, 1934 |